US009164471B2

(12) United States Patent
Kondo

(10) Patent No.: US 9,164,471 B2
(45) Date of Patent: Oct. 20, 2015

(54) IMAGE FORMING APPARATUS

(75) Inventor: Kazuhisa Kondo, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 182 days.

(21) Appl. No.: 13/181,327

(22) Filed: Jul. 12, 2011

(65) Prior Publication Data

US 2012/0013930 A1 Jan. 19, 2012

(30) Foreign Application Priority Data

Jul. 16, 2010 (JP) ................................. 2010-162140

(51) Int. Cl.
*G06F 3/12* (2006.01)
*G03G 21/16* (2006.01)

(52) U.S. Cl.
CPC .... *G03G 21/1628* (2013.01); *G03G 2221/1687* (2013.01)

(58) Field of Classification Search
USPC ................................................ 358/1.13–1.16
See application file for complete search history.

(56) References Cited

U.S. PATENT DOCUMENTS

| | | | | |
|---|---|---|---|---|
| 8,103,186 | B2 * | 1/2012 | Andoh et al. | 399/110 |
| 2004/0247337 | A1 * | 12/2004 | Ohama et al. | 399/107 |
| 2009/0169252 | A1 * | 7/2009 | Sato | 399/116 |
| 2009/0219706 | A1 * | 9/2009 | Satoh | 361/807 |
| 2010/0302570 | A1 * | 12/2010 | Ito | 358/1.13 |
| 2011/0006472 | A1 * | 1/2011 | Hirai et al. | 271/220 |
| 2011/0075230 | A1 * | 3/2011 | Kawai | 358/498 |

FOREIGN PATENT DOCUMENTS

| | | | |
|---|---|---|---|
| JP | H08-265517 | A | 10/1996 |
| JP | 2001-242563 | A | 9/2001 |
| JP | 2006-030219 | A | 2/2006 |
| JP | 2006-042003 | A | 2/2006 |
| JP | 2008-180892 | A | 8/2008 |
| JP | 2009-038787 | A | 2/2009 |
| JP | 2009-157064 | A | 7/2009 |

OTHER PUBLICATIONS

Notice of Reasons for Rejection dated Nov. 13, 2013 of corresponding Japanese Application No. 2010-162140—2 pages.

* cited by examiner

*Primary Examiner* — Huo Long Chen
*Assistant Examiner* — Kevin Ky
(74) *Attorney, Agent, or Firm* — Knobbe Martens Olson & Bear LLP

(57) ABSTRACT

An image forming apparatus includes, an upper cabinet disposed openably and closably on a main cabinet, reader cover disposed openably and closably on the upper cabinet and covering the image reader when the reader cover is closed and restriction mechanism preventing the reader cover from opening relative to the upper cabinet when the upper cabinet is open relative to the main cabinet. The restriction mechanism includes a first engagement member disposed at the upper cabinet and a second engagement member disposed at the reader cover and engageable with the first engagement member. The reader cover is prevented from opening relative to the upper cabinet when the first engagement member engages with the second engagement member. The second engagement member is urged to project from the reader cover towards the upper cabinet and movable from the upper cabinet to the reader cover.

9 Claims, 14 Drawing Sheets

IMAGE FORMING APPARATUS

This application is based on and claims the benefit of priority from Japanese Patent Application No. 2010-162140, filed on Jul. 16, 2010, the content of which is incorporated herein by reference.

BACKGROUND OF THE INVENTION

1. Field of the Invention

The present invention relates to an image forming apparatus that forms an image on a sheet of medium such as a sheet of paper, or the like.

2. Related Art

An image forming apparatus such as a copying machine has been known, which includes a main cabinet that has an image forming unit for forming an image on a sheet of medium based on image information, an upper cabinet that has an image reader for acquiring image information by reading an image on a document and that is disposed openably and closably at an upper portion of the main cabinet, and a document conveyance unit including a reader cover that is disposed openably and closably at an upper portion of the upper cabinet and covers the image reading unit when the reader cover is closed.

This type of image forming apparatus is provided with a restriction mechanism for preventing the document conveyance unit from opening with respect to the upper cabinet when the upper cabinet is open with respect to the main cabinet. The restriction mechanism prevents a phenomenon in which the document conveyance unit is open with respect to the upper cabinet when the upper cabinet is open with respect to the main cabinet.

The restriction mechanism includes a first engagement member provided at the upper cabinet and a second engagement member that is provided at the reader cover to project towards the upper cabinet and engageable with the first engagement member. The restriction mechanism prevents the reader cover from opening with respect to the upper cabinet when the first engagement member engages with the second engagement member.

When the reader cover is opened or closed by a user while the upper cabinet is closed with respect to the main cabinet, it is likely that the user gets injured due to the projecting second engagement member coming into contact with a hand or the like of the user if the second engagement member projects towards the upper cabinet. Since the second engagement member of the restriction mechanism projects towards the upper cabinet, it is also likely that the user gets injured due to the second engagement member coming into contact with the hand or the like of the user when the user opens or closes the reader cover while the upper cabinet is closed with respect to the main cabinet.

SUMMARY OF THE INVENTION

The present invention provides an image forming apparatus, which includes a main cabinet, an upper cabinet, a reader cover and a restriction mechanism. The main cabinet includes an image forming unit configured to form an image on a sheet of medium based on information related to the image. The upper cabinet is disposed openably and closably on the main cabinet and includes an image reader configured to read an image of an original document to obtain the information related to the image. The reader cover is disposed openably and closably on the upper cabinet and configured to cover the image reader when the reader cover is closed. The restriction mechanism is configured to prevent the reader cover from opening with respect to the upper cabinet when the upper cabinet is open with respect to the main cabinet. The restriction mechanism includes a first engagement member and a second engagement member: the first engagement member is disposed at the upper cabinet, and the second engagement member is disposed at the reader cover so as to project towards the upper cabinet and configured to be engageable with the first engagement member. The reader cover is prevented from opening with respect to the upper cabinet when the first engagement member engages with the second engagement member. The second engagement member is urged to project from the reader cover towards the upper cabinet and configured to be movable from the upper cabinet to the reader cover.

The present invention provides the image forming apparatus that reduces the risk to cause a user to get injured while the user is opening or closing the reader cover, through preventing the second engagement member, which is provided at the reader cover to restrict opening of the reader cover with respect to the upper cabinet, from coming into contact with the hand or the like of the user.

BRIEF DESCRIPTION OF THE DRAWINGS

FIG. 11A shows an engaged configuration and FIG. 11B shows a disengaged configuration;

FIG. 12A shows a natural configuration and FIG. 12B shows an upwardly pressed configuration;

FIG. 13A is an enlarged perspective view and FIG. 13B is an enlarged right side view;

FIG. 14A shows an operating state when a force is applied directly from below, FIG. 14B shows an operating state when a force is applied obliquely from left below, and FIG. 14C shows an operating state when a force is applied obliquely from right below.

DETAILED DESCRIPTION OF THE INVENTION

Figure 1:
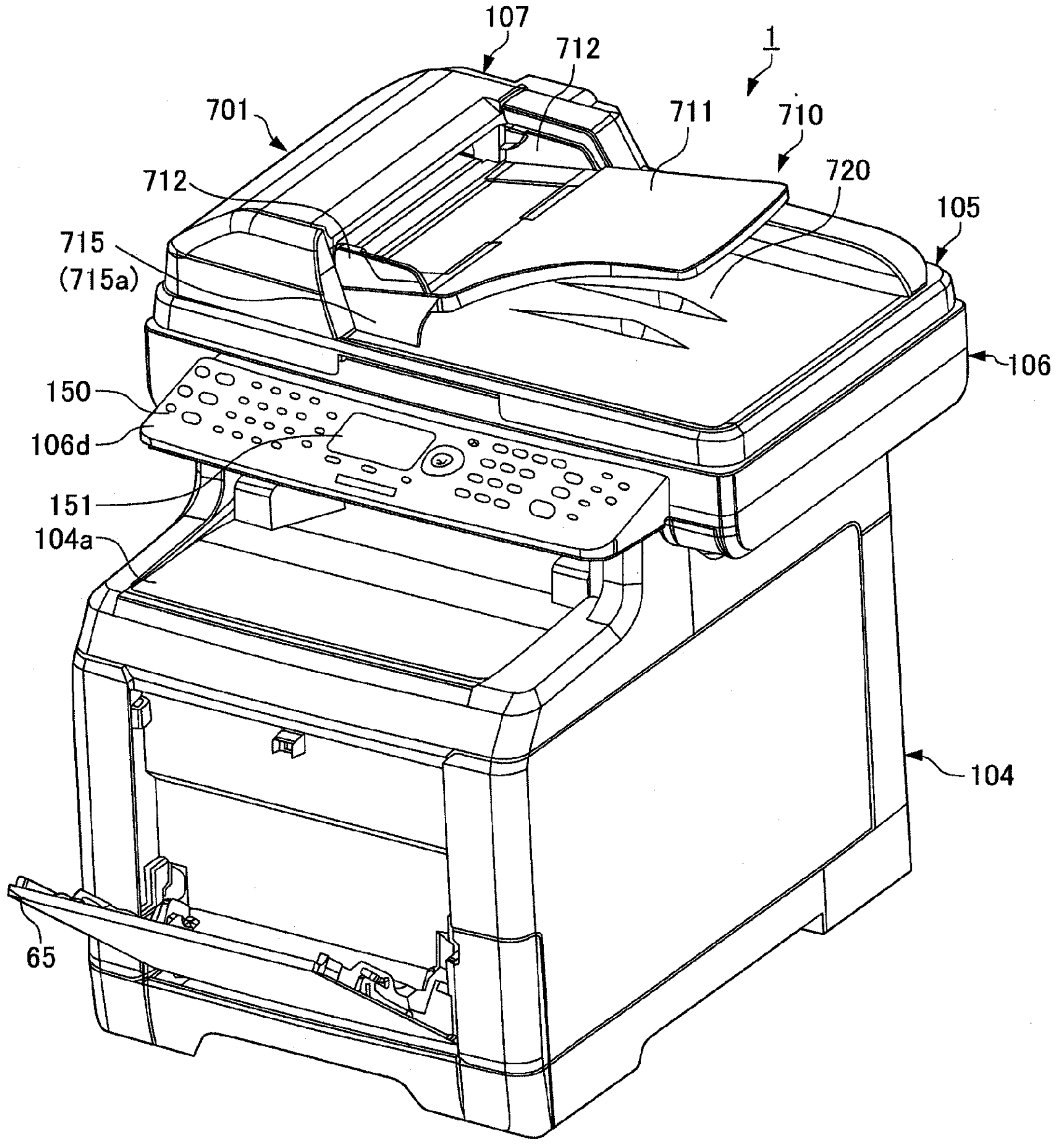
FIG. 1 is an external perspective view of a copying machine 1 according to a first embodiment of an image forming apparatus according to the present invention.

A copying machine 1 according to a first embodiment of an image forming apparatus of the present invention will be described hereafter making reference to the figures. Firstly, the overall configuration of the copying machine 1 will be described.

As illustrated in FIGS. 1 to 4, the copying machine 1 includes a main cabinet 104 and a document image reading unit 105. The document image reading unit 105 includes an upper cabinet 106 and a document conveyer 107.

Figure 5:
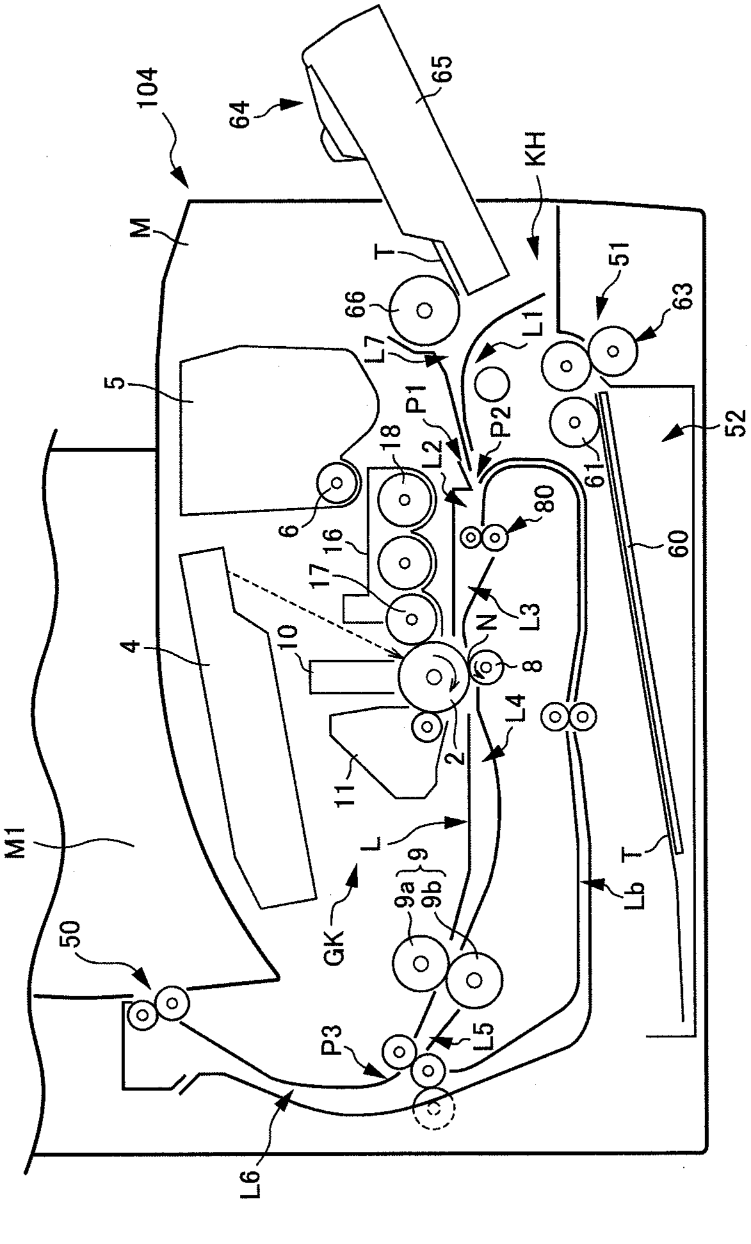
FIG. 5 is a left side view illustrating the disposition of elements in the main cabinet 104 of the copying machine 1 illustrated in FIG. 1.

As illustrated in FIG. 5, the main cabinet 104 houses an image forming unit GK (described hereafter) that forms an image on a sheet of paper T (sheet) based on image information. As illustrated in FIGS. 1 to 4, a main upper cover 104*a* is disposed openably and closably at an upper portion of the main cabinet 104. When the main upper cover 104*a* is in an open configuration, it is possible to perform maintenance of the image forming unit GK and exchange of a toner cartridge 5 (described later), which are disposed inside the main cabinet 104.

Figure 2:
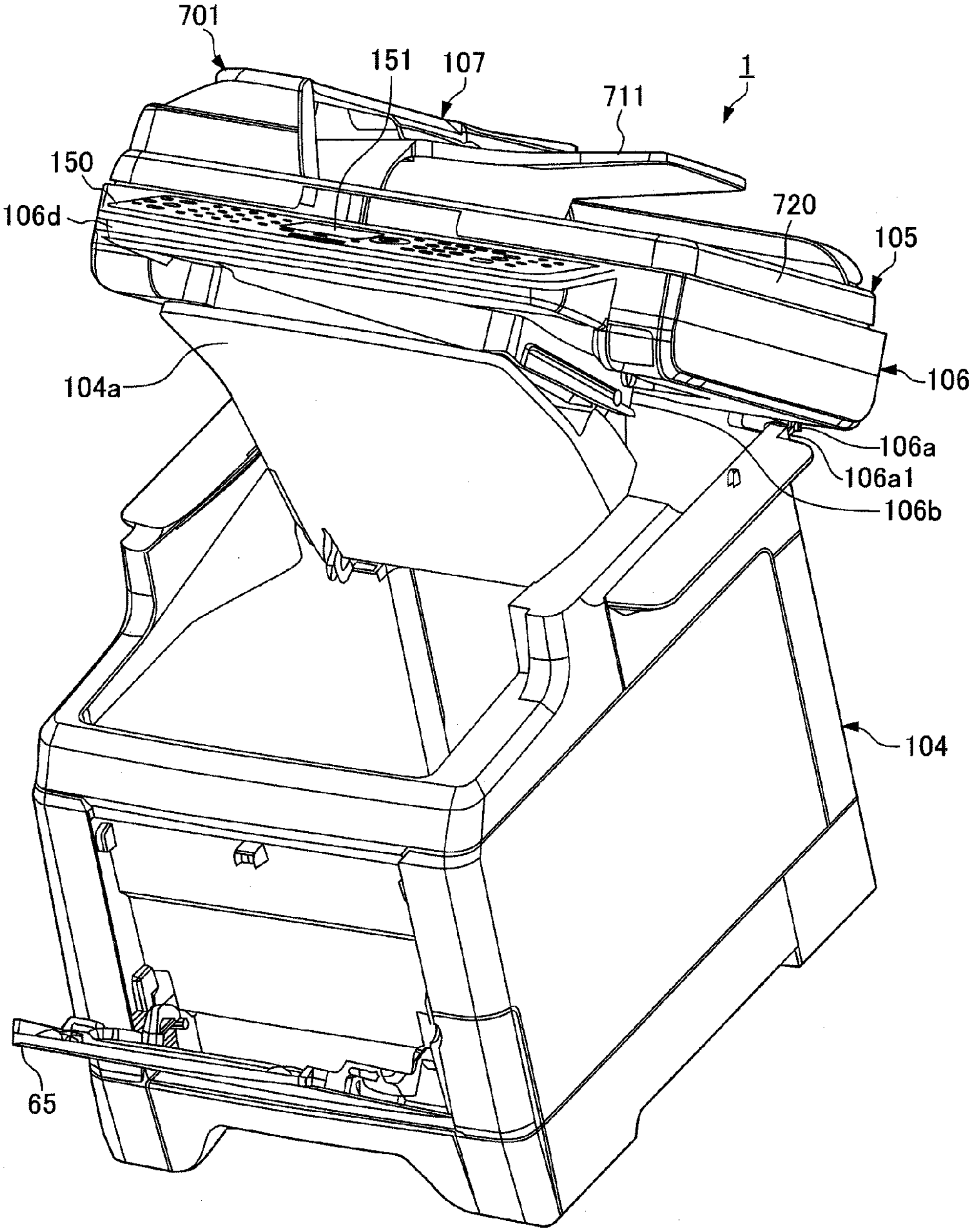
FIG. 2 is a perspective view showing an upper cabinet 106 being open with respect to a main cabinet 104 in the copying machine 1 illustrated in FIG. 1.

As illustrated in FIGS. 1 and 2, the document image reading unit 105 is disposed openably and closably with respect to the main cabinet 104 at an upper portion of the main cabinet 104. The document image reading unit 105 includes the upper cabinet 106 and the document conveyer 107.

The upper cabinet 106 is disposed openably and closably at an upper portion of the main cabinet 104. The upper cabinet 106 includes an image reader 120 (refer to FIG. 6) that acquires image information by reading an image on a document. A lower rear end of the upper cabinet 106 is connected to an upper rear end of the main cabinet 104 by a lower first connection portion 106*a* (refer to FIG. 2). A lower surface of the upper cabinet 106 is connected to an upper surface of the main upper cover 104*a* by a lower second connection portion 106*b* (refer to FIG. 2). Consequently, when the upper cabinet 106 is in a closed configuration (refer to FIG. 1) or an open configuration (refer to FIG. 2), the main upper cover 104*a* accompanies opening or closing of the upper cabinet 106, resulting in a closed configuration (refer to FIG. 1) or an open configuration (refer to FIG. 2), respectively. Furthermore, the upper cabinet 106 includes an operation panel 106*d* disposed to project forward. The operation panel 106*d* includes a display unit 151 and an operation unit 150 having a plurality of keys.

Figure 3:
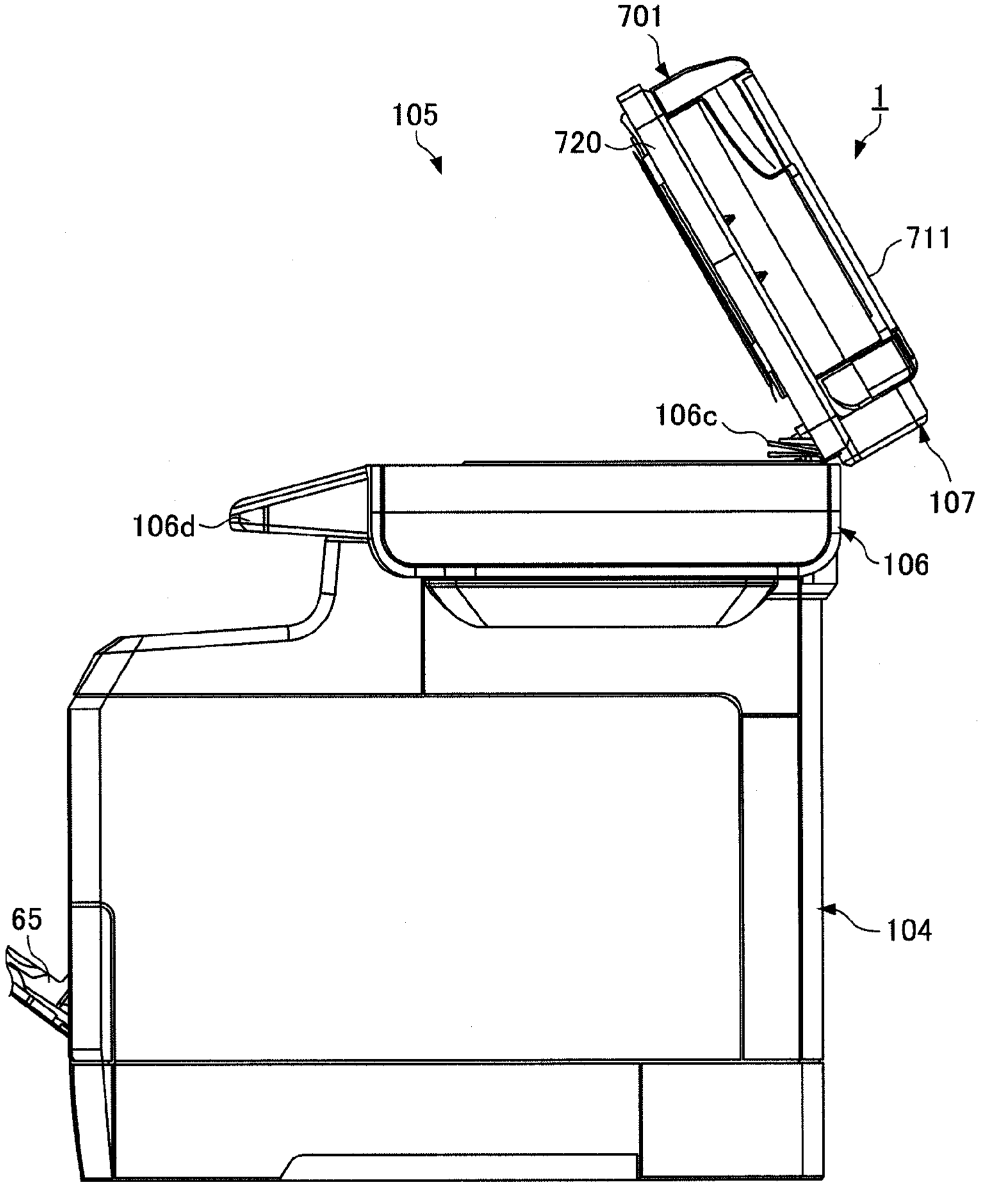
FIG. 3 is a right side view of the copying machine 1 illustrated in FIG. 1 in which a document conveyer 107 is open with respect to the upper cabinet 106 while the upper cabinet 106 is closed with respect to the main cabinet 104.
Figure 4:
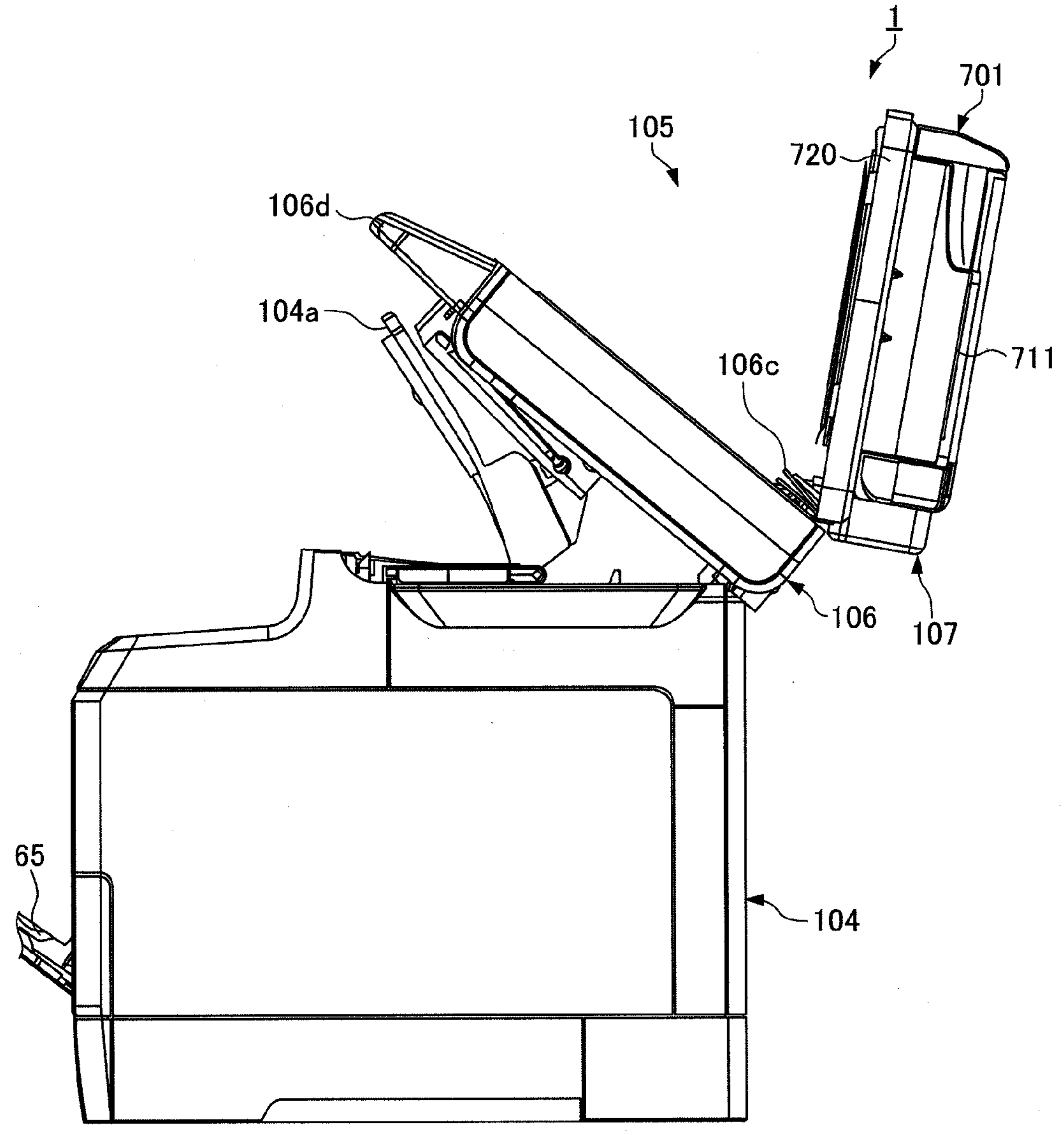
FIG. 4 is a right side view of the copying machine 1 illustrated in FIG. 1 in which the document conveyer 107 is open with respect to the upper cabinet 106 and the upper cabinet 106 is open with respect to the main cabinet 104.
Figure 6:
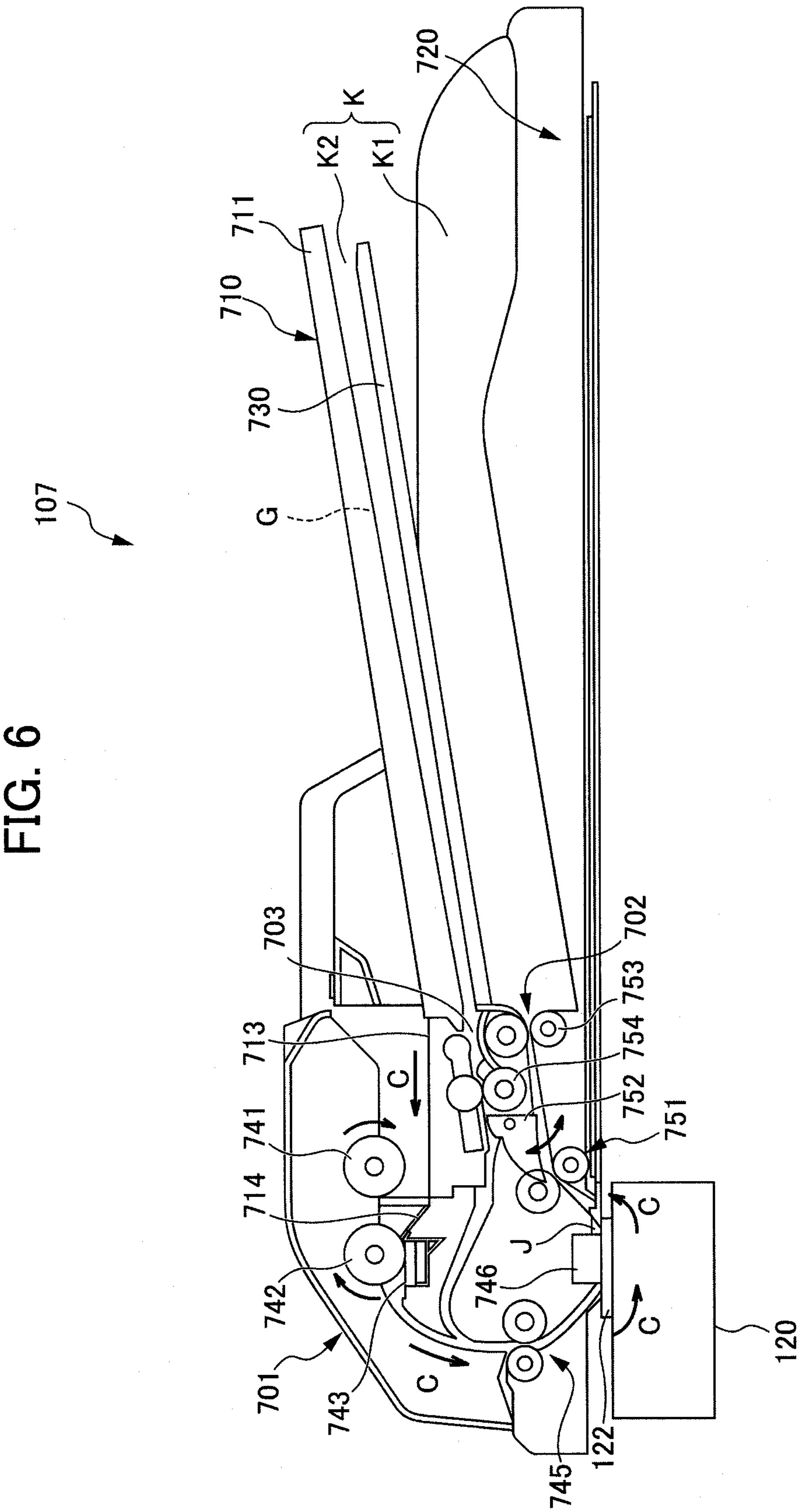
FIG. 6 is a schematic sectional view of the document conveyer 107.
Figure 7:
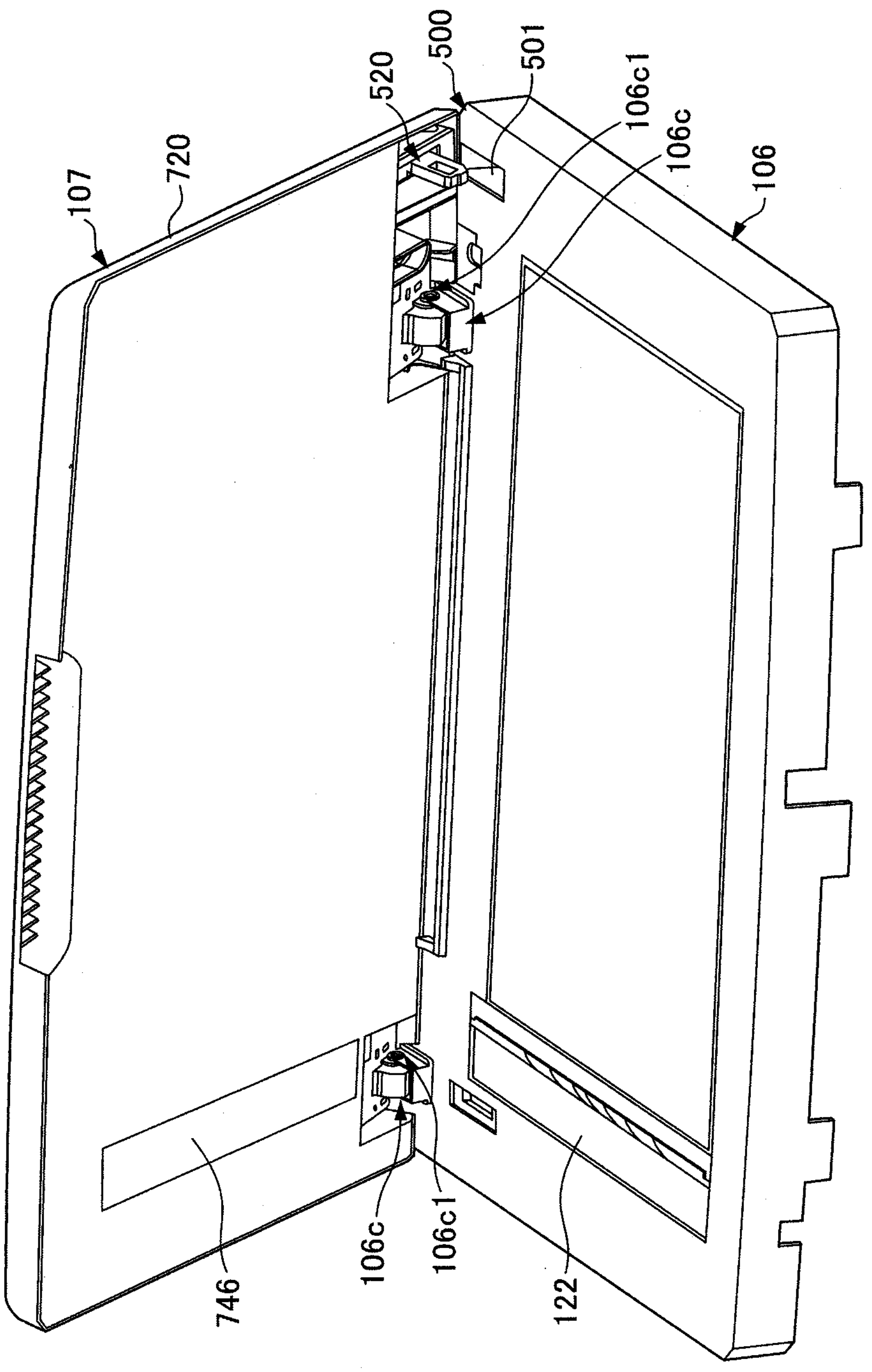
FIG. 7 is a perspective view showing the document conveyer 107 being open with respect to the upper cabinet 106.

As illustrated in FIG. 6, the document conveyer 107 conveys a document G to an image reading position J at the image reader 120. As illustrated in FIGS. 3 and 7, the document conveyer 107 includes a reader cover that is disposed openably and closably at an upper portion of the upper cabinet 106 and covers the image reader 120 when the reader cover is closed. The reader cover includes a document collection unit 720 (described later).

A lower rear end of the document conveyer 107 is connected to an upper rear end of the upper cabinet 106 by an upper third connection portion 106*c* (refer to FIG. 3).

The upper cabinet 106 and the document conveyer 107 include a restriction mechanism 500. The restriction mechanism 500 prevents the document collection unit 720 as a reader cover from opening with respect to the upper cabinet 106 (change in configurations shown in FIG. 2 to FIG. 4) when the upper cabinet 106 is open with respect to the main cabinet 104. The restriction mechanism 500 functions to prevent the document conveyer 107 from opening with respect to the upper cabinet 106 in the following situation: the document conveyer 107 is closed with respect to the upper cabinet 106, and the upper cabinet 106 changes from being in a closed configuration (refer to FIG. 1) to an open configuration (refer to FIG. 2) with respect to the main cabinet 104. The restriction mechanism 500 will be described in detail hereafter.

Next, an apparatus main body M that includes the main cabinet 104 will be described in detail making reference to FIG. 5.

As illustrated in FIG. 5, the apparatus main body M includes an image forming unit GK that forms a predetermined image on a sheet of paper T based on predetermined image information, and a sheet supply/discharge unit KH that supplies a sheet of paper T to the image forming unit GK and discharges the sheet of paper T with an image formed thereon.

The main cabinet 104 forms the external shape of the apparatus main body M. The image forming unit GK, the sheet supply/discharge unit KH and the like are disposed inside the main cabinet 104.

As illustrated in FIG. 5, the image forming unit GK includes a photosensitive drum 2, charging unit 10, laser scanner unit 4, developing device 16, toner cartridge 5, toner supply device 6, transfer roller 8, drum cleaning device 11, and fixing unit 9.

The sheet supply/discharge unit KH includes a supply cartridge 52, a manual tray 65, a pair of registration rollers 80, and a conveyance path L for a sheet of paper T.

The photosensitive drum 2 is formed from a cylindrical member, and functions as an image carrier. The photosensitive drum 2 is disposed in the apparatus main body M such that the photosensitive drum 2 is rotatable about a rotation shaft perpendicular to the surface of the page in FIG. 5. An electrostatic latent image is formed on a surface of the photosensitive drum 2.

The charging unit 10 is disposed on a vertically upper side (upward) of the photosensitive drum 2. The charging unit 10 imparts the surface of the photosensitive drum 2 with a uniform positive charge (positive polarity).

The laser scanner unit 4 is spaced away from the photosensitive drum 2 on a vertically upper side (upward) of the photosensitive drum 2. The laser scanner unit 4 is composed of a laser light source (not shown), polygon mirror, polygon mirror drive motor, and the like.

The laser scanner unit 4 performs scan exposure of the surface of the photosensitive drum 2 based on image information output from the image reader 120. The charge that is created on the surface of the photosensitive drum 2 is eliminated by scan exposure performed by the laser scanner unit 4. In this manner, an electrostatic latent image is formed on the surface of the photosensitive drum 2.

The developing device 16 is disposed in front of the photosensitive drum 2 (the right side in FIG. 5). The developing device 16 develops a monotone toner image (normally black) on the electrostatic latent image formed on the photosensitive drum 2. The developing device 16 is configured with a stirring roller 18 for stirring toner and a developing roller 17 disposed opposite to the photosensitive drum 2.

The toner cartridge 5 contains toner that is to be supplied to the developing device 16.

The toner supply device 6 supplies the toner contained in the toner cartridge 5 to the developing device 16.

The drum cleaning device 11 is disposed behind the photosensitive drum 2 (the left side of FIG. 5). The drum cleaning device 11 eliminates material attached to and toner remaining on the surface of the photosensitive drum 2.

The transfer roller 8 causes the toner image developed on the surface of the photosensitive drum 2 to be directly transferred to a sheet of paper T. A transfer bias is applied to the transfer roller 8 by a voltage application device such that the toner image developed on the photosensitive drum 2 is transferred to the sheet of paper T.

In the present embodiment, although the toner image developed on the surface of the photosensitive drum 2 is directly transferred to the sheet of paper T without an intermediate transfer belt or the like, the invention is not limited in this regard. For example, it may be alternatively possible that the toner image developed on the surface of the photosensitive drum 2 is transferred to a sheet of paper T indirectly through an intermediate transfer belt or the like.

The transfer roller 8 is configured to displace between an abutment position in contact with the photosensitive drum 2 and a separated position in which the transfer roller 8 is spaced away from the photosensitive drum 2. More specifically, the transfer roller 8 displaces to the abutment position when the toner image that is developed on the photosensitive drum 2 is transferred to a sheet of paper T, and displaces to the separated position in other situations.

The sheet of paper T is sandwiched by the photosensitive drum 2 and the transfer roller 8, and is pressed into abutment with the surface of the photosensitive drum 2 (a side on which the toner image is developed). In this manner, a transfer nip N as a transfer portion is formed, and the toner image that is developed on the photosensitive drum 2 is transferred to the sheet of paper T.

The fixing unit 9 melts the toner that forms the toner image transferred onto the sheet of paper T, and fixes the toner to the sheet of paper T. The fixing unit 9 includes a heating roller 9*a* that is heated by a heater and a pressure roller 9*b* that is pressed into contact with the heating roller 9*a*. The heating roller 9*a* and the pressure roller 9*b* convey the sheet of paper T that has the transferred toner image, while they sandwich the sheet of paper T. Since the sheet of paper T is conveyed while sandwiched between the heating roller 9*a* and the pressure roller 9*b*, the toner transferred onto the sheet of paper T is melted and fixed to a surface of the sheet of paper T.

The supply cassette 52 is disposed at a lower portion of the apparatus main body M (a vertically lower portion). The supply cassette 52 is disposed horizontally drawable at a front portion of the apparatus main body M (the right side of FIG. 5). The supply cassette 52 includes a mounting plate 60 for mounting sheets of paper T. The sheets of paper T stacked on the mounting plate 60 are stored in the supply cassette 52. A cassette supply unit 51 is disposed on a side of discharging a sheet of paper T at an end of the supply cassette 52 (the right end of FIG. 5). The cassette supply unit 51 feeds a sheet of paper T that is stored in the supply cassette 52 to the conveyance path L.

The cassette supply unit 51 includes a double-feed prevention mechanism that is provided with a front feed roller 61 for extracting a sheet of paper T stored on the mounting plate 60 and a pair of rollers 63 for feeding the sheets of paper T one by one into the conveyance path L.

The conveyance path L for conveying a sheet of paper T is formed between the cassette supply unit 51 or the manual feed portion 64 and the paper discharge portion 50. The conveyance path L includes a first conveyance path L1 from the cassette supply unit 51 to a first joint flow portion P1, a second conveyance path L2 from the first joint flow portion P1 to the pair of registration rollers 80, a third conveyance path L3 from the pair of registration rollers 80 to the transfer roller 8, a fourth conveyance path L4 from the transfer roller 8 to the fixing portion 9, a fifth conveyance path L5 from the fixing portion 9 to a branching portion P3, and a sixth conveyance path L6 from the branching portion P3 to the paper discharge portion 50.

The conveyance path L includes a seventh conveyance path L7 from the manual tray 65 to the first joint flow portion P1. The first joint flow portion P1 is where the first conveyance path L1 and the seventh conveyance path L7 join, the first conveyance path L1 conveying a sheet of paper T from the cassette supply unit 51 and the seventh conveyance path L7 conveying a sheet of paper T from the manual tray 65.

A second joint flow portion P2 is disposed midway in the second conveyance path L2. Furthermore, the conveyance path L includes a return conveyance path Lb from the branching portion P3 to the second joint flow portion P2. The second joint flow portion P2 is where the second conveyance path L2 and the return conveyance path Lb join.

The pair of registration rollers 80 is disposed upstream of the direction of conveyance of a sheet of paper T in the transfer roller 8 (the right side of FIG. 5). The pair of registration rollers 80 is for correcting skew (inclined feed) of a sheet of paper T or for adjusting timing with respect to a toner image.

The return conveyance path Lb is provided for causing a surface of a sheet of paper T (non-printed surface) that is opposite to a surface that has been already printed to face the photosensitive drum 2 when duplex printing of the sheet of paper T is performed.

The return conveyance path Lb reverses the front and back surfaces of the sheet of paper T that is conveyed from the branching portion P3 towards the paper discharge portion 50 and returns the sheet of paper T to the second conveyance path L2. A toner image is transferred by the photosensitive drum 2 to the non-printed surface of the sheet of paper T that has undergone reversal of the front and back surfaces in the return conveyance path Lb.

The manual supply portion 64 is provided above the supply cassette 52 on a front side of the apparatus main body M (right side of FIG. 5). The manual supply portion 64 includes the manual tray 65 and a supply roller 66. A base portion of the manual tray 65 is disposed rotatably in proximity to an entry port of the seventh conveyance path L7. The manual tray 65 makes a portion of a front surface of the apparatus main body M when the manual tray 65 is closed. The supply roller 66 extracts a sheet of paper T mounted on the manual tray 65 and feeds the sheet of paper T towards the seventh conveyance path L7.

The manual supply portion 64 supplies the sheet of paper T mounted on the manual tray 65 when it is open to the second conveyance path L2 through the seventh conveyance path L7 and the first joint flow portion P1.

The paper discharge portion 50 is formed at an end of the sixth conveyance path L6. The paper discharge portion 50 is disposed in an upper portion of the apparatus main body M. The paper discharge portion 50 opens towards the front of the apparatus main body M (the right side of FIG. 5). The paper discharge portion 50 discharges the sheet of paper T on which toner has been fixed by the fixing unit 9 to outside the apparatus main body M.

A discharged paper collecting portion M1 is formed on a side of an open port of the paper discharge portion 50. The discharged paper collecting portion M1 is formed on an upper surface (outer surface) of the apparatus main body M. The discharged paper collecting portion M1 is where the upper surface of the apparatus main body M is recessed (vertically downward). A bottom surface of the discharged paper collecting portion M1 makes a portion of the upper surface of the apparatus main body M. Sheets of paper T with images transferred thereon that are discharged from the paper discharge portion 50 are stacked on the discharged paper collecting portion N1.

The image reader 120 includes an illumination portion including a light source, a plurality of mirrors forming a light path, an imaging lens, a CCD as a reading element, and a CCD circuit board to execute processes for image information read by the CCD and to output the image information to the apparatus main body M.

An image on a document G that has been conveyed to the image reading position J in the document conveyance portion 107 is read by the CCD.

The image information output from the image reader 120 is sent to the apparatus main body M.

The image information sent as described above is entered into an image forming control unit (not shown) in the apparatus main body M. Base on the image information, the image forming control unit controls the photosensitive drum 2 as an image carrier, the charging unit 10, the laser scanner unit 4, the developing device 16, and the like, which compose the image forming portion GK, respectively. A toner image is formed on the photosensitive drum 2 based on the image information.

An image that is the same as the image on the document G is transferred based on the image information onto the sheet of paper T that is conveyed through the conveyance path L to the transfer nip N formed by the photosensitive drum 2. The sheet of paper T with the image formed thereon is discharged from the paper discharge portion 50 to the discharged paper collecting portion M1.

Next, the document conveyance portion 107 will be described in detail.

As illustrated in FIG. 6, the document conveyance portion 107 includes a conveyance mechanism housing 701, document mounting portion 710, document collection unit 720, and intermediate tray 730.

A conveyance mechanism of the document conveyance portion 107 is stored in the conveyance mechanism housing 701.

The document mounting portion 710 is where a document G is mounted, an image of which is to be read.

The document collection unit 720 is disposed vertically below the document mounting portion 710. Documents G that have passed through the image reading position J are collected at the document collection unit 720. The document collection unit 720 also has a function of a reader cover for covering the image reader 120 when the document collection unit 720 is closed.

The intermediate tray 730 is disposed between the document mounting portion 710 and the document collection unit 720. The intermediate tray 730 partitions a space K between the document mounting portion 710 and the document collection unit 720 into a first space K1 near the document collection unit 720 and a second space K2 near the document mounting portion 710.

As illustrated in FIGS. 1 and 6, the document mounting portion 710 includes a mounting portion tray 711, document pressing portion 712, tray support wall 715, standby portion 713, and separating wall 714.

A pair of document pressing portions 712 is provided at a base portion (near the document conveyance portion 107) on a mounting surface (upper surface) of the mounting portion tray 711. The pair of document pressing portions 712 is slidably disposed such that the pair of document pressing portions 712 approaches to or departs away from each other in a direction of the width of the mounting portion tray 711 (left-right direction of the document conveyance portion 107), accommodating to the width of a document G.

The tray support wall 715 supports the mounting portion tray 711. The tray support wall 715 is provided at the base portion of the mounting portion tray 711 (near the document conveyance portion 107).

The tray support wall 715 includes a left support wall 715*a* on the left side of the document conveyance portion 107 (the front side of FIG. 6) and a right support wall 715*b* on the right side of the document conveyance portion 107 (the deep side of FIG. 6). The left support wall 715*a* and the right support wall 715*b* are plate-shaped members that extend in a vertical direction.

The standby portion 713 is provided inside the conveyance mechanism housing 701, and is adapted to extend in a substantially horizontal direction along a conveyance direction of a document G. A front end of a document G (a downstream end in a feed direction C) is disposed on an upper surface of the standby portion 713.

The separating wall 714 is disposed downstream of the feed direction C in the standby portion 713. The separating wall 714 is a slope that rises gradually towards downstream of the feed direction C.

When the front end of the document G that is mounted on the document mounting portion 710 abuts against the separating wall 714, the document G is in a standby state at the standby portion 713. Standby documents G stacked in the standby portion 713 are effectively separated (isolated) by the separating wall 714 over which front ends of the documents G ride.

As illustrated in FIG. 6, the conveyance mechanism housing 701 includes a first document discharge portion 702, second document discharge portion 703, first conveyance unit, second conveyance unit, and third conveyance unit.

The first document discharge portion 702 faces the first space K1, and discharges a document G towards the first space K1.

The second document discharge portion 703 faces the second space K2, and discharges part of documents G towards the second space K2.

The first conveyance unit conveys a document G mounted on the document mounting unit 710 to the image reading position J.

The second conveyance unit conveys the document G lying on the image reading position J to the first document discharge portion 702.

The third conveyance unit uses the second space K2 to switch-back and reverse the front and back surfaces of a document G lying on the image reading position J, conveying the document G back to the image reading position J.

The first conveyance unit includes a pick-up roller 741, feed roller 742, separating pad 743, and a pair of pre-read rollers 745.

The pick-up roller 741 is configured to displace to a home position in which it is separated from a document G and a pick-up position in which it comes into light contact with a surface of the document G. The pick-up roller 741 is configured to displace from the home position to the pick-up position when the pick-up roller 741 is driven to rotate. The pick-up roller 741 is configured to feed a document G, and then return from the pick-up position to the home position.

The feed roller 742 is configured to be abutable with the separating pad 743.

The pair of pre-read rollers 745 is disposed upstream in the feed direction C of the image reading position J. The pair of pre-read rollers 745 conveys the document G towards the image reading position J while it sandwiches the document G that is fed from the feed roller 742.

A document guide 746 is disposed vertically over the image reading position J. The document guide 746 is disposed opposite to a transmission member 122 interposing a minute space therebetween, such that a conveyance path for a document G is formed at the image reading position J.

A portion (a vertically downward side) of the conveyance mechanism housing 701 corresponding to the image reading position J is open. In this manner, a document G (a surface on which an image to be read is provided) is disposed facing the transmission member 122 that makes a reading surface of the image reader 120, when the document G passes through the image reading position J.

A pair of first discharge rollers 753 is disposed at the first document discharge portion 702. The pair of first discharge rollers 753 discharges the document G that is conveyed to the pair of first discharge rollers 753 to the first space K1.

A pair of second discharge rollers 754 is disposed at the second document discharge portion 703. The pair of second discharge rollers 754 discharges the document G that is conveyed to the pair of second discharge rollers 754 to the second space K2.

The second conveyance unit includes a pair of post-read rollers 751, a switching member 752, and the pair of first discharge rollers 753. The second conveyance unit conveys the document G that is positioned at the image reading position J to the first document discharge unit 702.

The pair of post-read rollers 751 conveys the document G that is conveyed from the image reading position J downstream in the feed direction C (towards the switching member 752).

The switching member 752 is disposed downstream of the pair of post-read rollers 751 in the feed direction C, and upstream of the pair of first discharge rollers 753 and the pair of second discharge rollers 754.

The switching member 752 is disposed switchable (swingable) between a first position and a second position. At the first position, a document G conveyed from the pair of post-read rollers 751 is guided towards the first document discharge portion 702 (the pair of first discharge rollers 753). At the second position, a document G is guided towards the second document discharge portion 703 (the pair of second discharge rollers 754).

The third conveyance unit includes the pair of post-read rollers 751, the switching member 752, and the pair of second discharge rollers 754. The third conveyance unit uses the second space K2 to switch-back and reverse the front and back surfaces of a document G positioned on the image reading position J, conveying the document G back to the image reading position J.

Next, the restriction mechanism 500 that provides one of features of the present invention will be described in detail with reference to FIGS. 7 to 11A and FIG. 11B.

Figure 8:
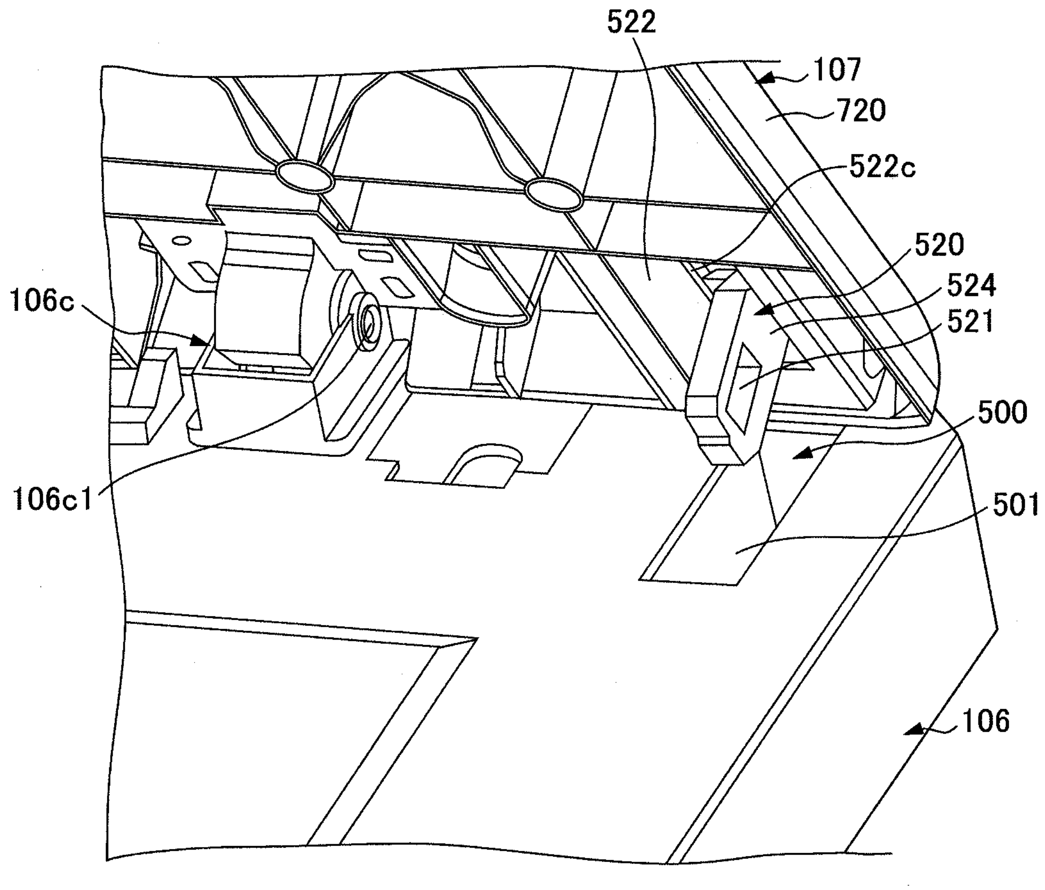
FIG. 8 is an enlarged view of the proximity of a second engagement member 520 in FIG. 7.
Figure 9:
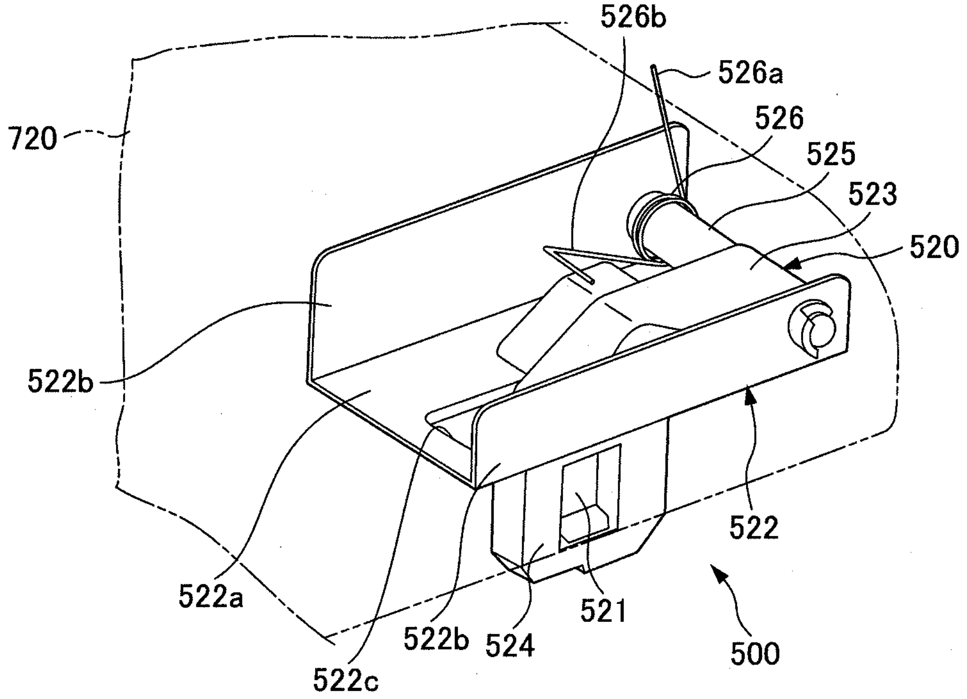
FIG. 9 is a perspective view showing transparently the proximity of the second engagement member 520 with the document conveyer 107 being closed with respect to the upper cabinet 106.
Figure 10:
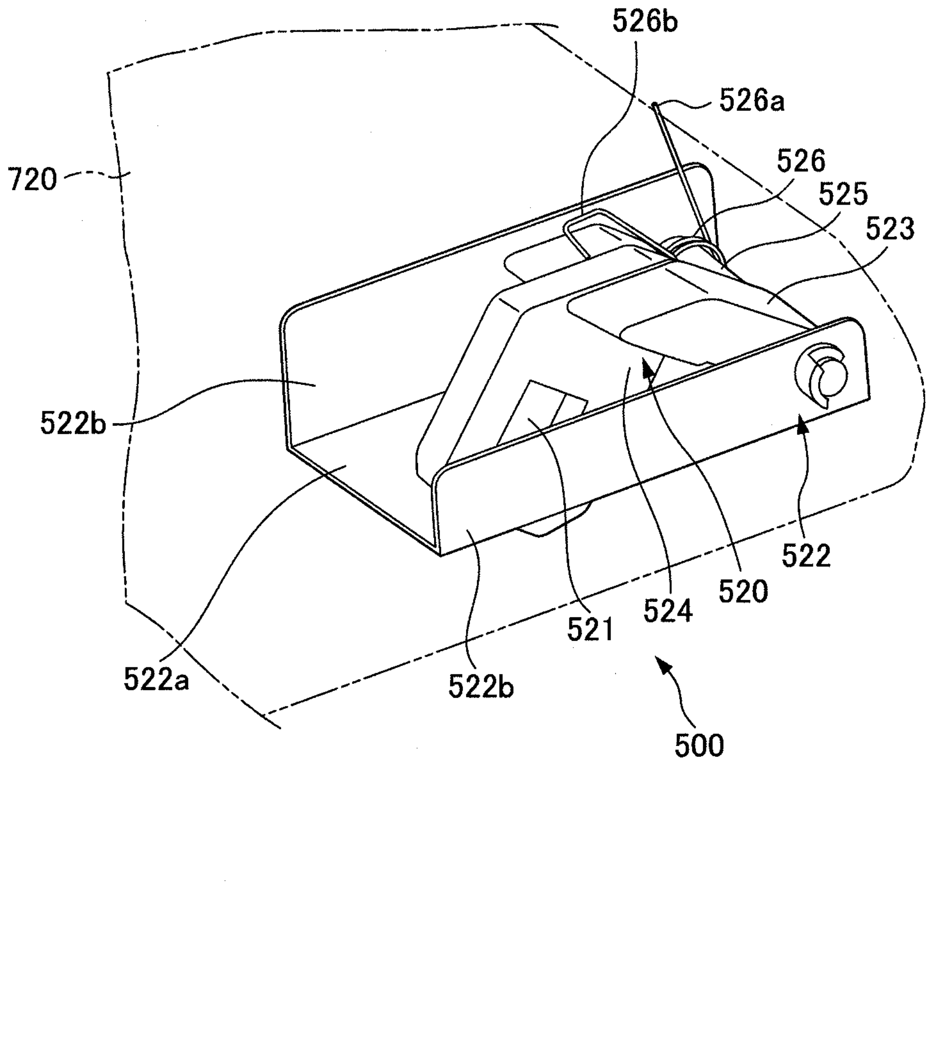
FIG. 10 is a perspective view showing transparently the proximity of the second engagement member 520 with the second engagement member 520 being pressed upwardly.
Figure 11A:
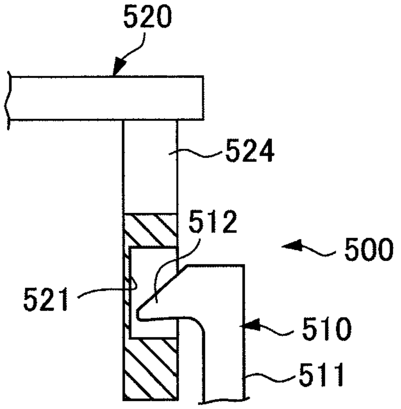
FIGS. 11A and 11B are schematic views of the engagement operation of the second engagement member 520 and the first engagement member 510.
Figure 11B:
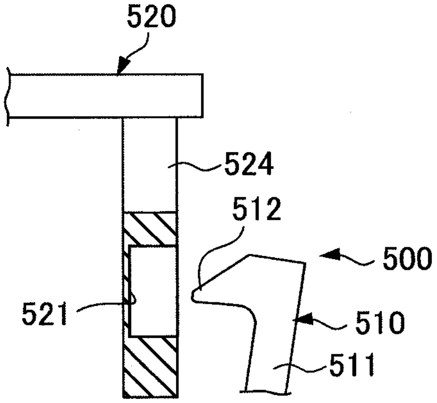

FIG. 8 is an enlarged view of the proximity of the second engagement member 520 in FIG. 7. FIG. 9 is a perspective view transparently showing the proximity of the second engagement member 520 when the document conveyer 107 is closed with respect to the upper cabinet 106. FIG. 10 is a perspective view transparently showing the proximity of the second engagement member 520 when the second engagement member 520 is pressed upwardly. FIGS. 11A and 11B are schematic views of the engagement operation of the second engagement member 520 and the first engagement member 510: FIG. 11A shows an engaged configuration and FIG. 11B shows a disengaged configuration.

The document collection unit 720 also has a function of a reader cover in the document conveyer 107. As illustrated in FIG. 7, the document collection unit 720 is connected openably and closably to the upper cabinet 106 by a pair of upper third connection portions 106*c*. The pair of upper third connection portions 106*c* is disposed on both side portions in the width direction (the direction of conveying a document) of the document collection unit 720. An opening/closing shaft 106*c*1 of the upper third connection portion 106*c* is disposed in parallel to an opening/closing shaft 106*a*1 (refer to FIG. 2) of the lower first connection portion 106*a* that connects the upper cabinet 106 openably and closably to the main cabinet 104. As illustrated in FIGS. 2 and 3, an opening and closing direction of the document collection unit 720 is the same as that of the upper cabinet 106.

The restriction mechanism 500 is provided outside the upper third connection portion 106*c*, on one side in the width direction of the document conveying portion 107 and the upper cabinet 106. As illustrated in FIG. 7 and FIGS. 11A-11B, the restriction mechanism 500 includes the first engagement member 510 and the second engagement member 520 engageable with the first engagement member 510. When the first engagement member 510 engages with the second engagement member 520, the restriction mechanism 500 prevents the document collection unit 720 from opening with respect to the upper cabinet 106 while the upper cabinet 106 is open with respect to the main cabinet 104.

The first engagement member 510 (refer to FIGS. 11A to 11B) is provided at the upper cabinet 106. The first engagement member 510 is disposed below (inside) a through hole 501 (refer to FIGS. 7 and 8) that is formed in an upper surface of the upper cabinet 106. As illustrated in FIGS. 11A and 11B, the first engagement member 510 includes a movable portion 511 and an engagement hook 512. The movable portion 511 is configured to be swingable with respect to the upper cabinet 106 about a lower end portion of the movable portion 511 as a fulcrum. The engagement hook 512 is integrally formed at the upper end portion of the movable portion 511. The engagement hook 512 performs and releases engagement with the engagement spot 521 of the second engagement member 520, when the movable portion 511 swings.

The second engagement member 520 is provided at the document collection unit 720 such that the second engagement member 520 projects towards the upper cabinet 106. As illustrated in FIGS. 9 and 10, the second engagement member 520 is rotatably connected to a mount 522 that is fixed to the document collection unit 720. The mount 522 includes a bottom plate 522*a* and a pair of upright side plates 522*b* that are bent on both sides of the bottom plate 522*a*.

The second engagement member 520 is supported rotatably via a rotation shaft 525. The rotation shaft 525 is configured to bridge the pair of side plates 522*b* of the mount 522. The second engagement member 520 includes a shaft portion 523 and an engagement portion 524. The shaft portion 523 extends along the bottom plate 522*a* in a natural configuration. The engagement portion 524 is substantially orthogonal to the shaft portion 523, passes through a through hole 522*c* that is formed in the bottom plate 522*a* of the mount 522, and extends to project towards the upper cabinet 106.

The engagement portion 524 of the second engagement member 520 includes an engagement spot 521 that engages with the engagement hook 512 of the first engagement member 510. As illustrated in FIG. 11, the engagement spot 521 includes a recess that is indented from one side surface towards the other side surface of the engagement portion 524.

The engagement spot 521 is not limited to a recess, and for example, may alternatively be formed as a through hole that passes from one side to the other side of the engagement portion 524.

The rotation shaft 525 rotatably supports the shaft portion 523 of the second engagement member 520. A helical spring 526 is wound onto the rotation shaft 525. An end 526*a* of the helical spring 526 is fixed to a predetermined position on a side closer to the document collection unit 720. The other end 526*a* of the helical spring 526 is configured to abut with the shaft portion 523 of the second engagement member 520. In this manner, the second engagement member 520 is biased by the helical spring 526 so that the engagement portion 524 including the engagement spot 521 projects from the document collection unit 720 towards the upper cabinet 106. The second engagement member 520 is configured to be displaceable from the upper cabinet 106 toward the document collection unit 720, when the second engagement member 520 rotates about the rotation shaft 525.

Next, the operation of the restriction mechanism 500 will be described.

When the document conveying unit 107 is closed with respect to the upper cabinet 106 and the upper cabinet 106 is closed with respect to the main cabinet 104, as shown in FIG. 1, the engagement portion 524 of the second engagement member 520 in the restriction mechanism 500 is rotated about the rotation shaft 525 by the biasing force exerted by the helical spring 526, so that the engagement portion 524 projects from the document collection unit 720 towards the upper cabinet 106 as illustrated in FIG. 9.

As illustrated in FIG. 11A, the engagement spot 521 of the engagement portion 524 that projects towards the upper cabinet 106 engages with the engagement hook 512 of the first engagement member 510 that is provided at the upper cabinet 106. With the second engagement member 520 engaging with the first engagement member 510, it is possible to restricts (prevents) the document collection unit 720 of the document conveyer 107 from opening with respect to the upper cabinet 106 during a change in configurations from FIG. 1 to FIG. 2, in which the upper cabinet 106 is open or on the way to being open with respect to the main cabinet 104.

Furthermore, as illustrated in FIG. 11B, it is possible to release the engagement of the engagement hook 512 of the first engagement member 501 and the engagement spot 521 of the second engagement member 520, if the movable portion 511 of the first engagement member 510 in the restriction mechanism 500 rotates (swings) outwardly. In this manner, it is possible to open and close the document collection unit 720 of the document conveyer 107 with respect to the upper cabinet 106, when the upper cabinet 106 is closed with respect to the main cabinet 104 as illustrated in FIG. 1.

When the document collection unit 720 of the document conveyer 107 is opened and closed with respect to the upper cabinet 106, the engagement portion 524 of the second engagement member 520 projects toward the upper cabinet 106. Consequently, there is a risk that the engagement portion 524 of the projecting second engagement member 520 may come into contact with the finger of a user, and the projecting end of the engagement portion 524 and an upper surface portion of the upper cabinet 106 may catch the finger therebetween. Even if the above situation occurs, the second engagement member 520 rotates about the rotation shaft 525 against the biasing force exerted by the helical spring 526, displacing towards the document collection unit 720 to be stored inside the mount 522, as illustrated in FIG. 10. In this manner, it is possible to reduce the risk of an injury to the finger or hand of a user by the second engagement member 520.

The copying machine 1 according to the first embodiment exhibits the following effects, for example.

The restriction mechanism 500, which prevents the document collection unit 720 from opening with respect to the upper cabinet 106 when the upper cabinet 106 is open with respect to the main cabinet 104, includes the first engagement member 510 and the second engagement member 520. The first engagement member 510 is provided at the upper cabinet 106. The second engagement member 520 is provided at the document collection unit 720 such that the second engagement member 520 projects towards the upper cabinet 106 and is engageable with the first engagement member 510. The second engagement member 520 is configured not only to be biased to project from the document collection unit 720 towards the upper cabinet 106, but also to be displaceable from the upper cabinet 106 towards the document collection unit 720.

Therefore, when the document collection unit 720 is opened and closed with respect to the upper cabinet 106, even if the hand or finger of the user comes into contact with the second engagement member 520 that projects from the document collection unit 720 towards the upper cabinet 106, the second engagement member 520 rotates about the rotation shaft 525 against the biasing force, thereby displacing towards the document collection unit 720. In this manner, the force related to the contact will be mitigated and absorbed. Therefore, it is possible to sufficiently reduce the risk of injury to the hand or finger of a user.

Second Embodiment

Figure 12A:
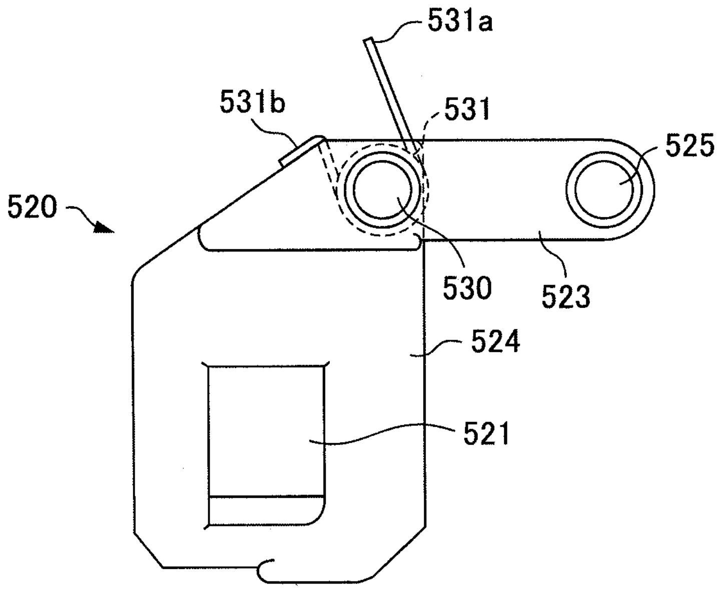
FIGS. 12A and 12B are enlarged right side views showing the configuration of the second engagement member 520 in the copying machine 1 according to a second embodiment.
Figure 12B:
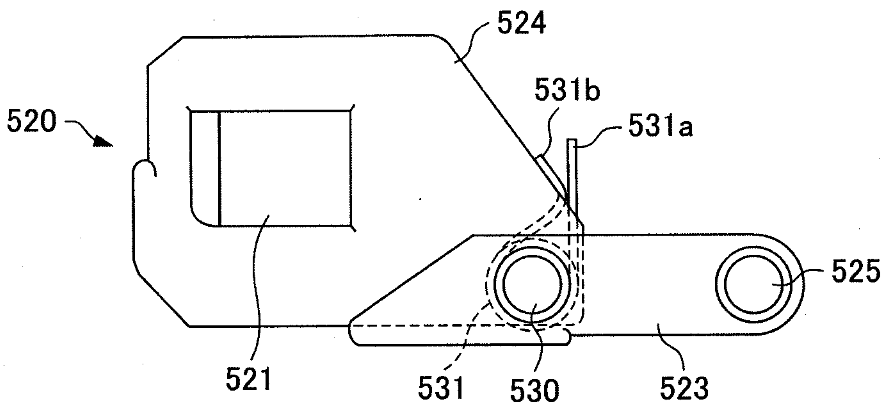

Next, a second embodiment of the present invention will be described with reference to FIG. 12. FIGS. 12A and 12B are enlarged right side views showing the configuration of a second engagement member 520 in a copying machine 1 according to a second embodiment: FIG. 12A shows the natural configuration and FIG. 12B shows a configuration pressed upwardly.

A restriction mechanism 500 according to the second embodiment mainly differs in the configuration of the second engagement member 520 in comparison to the restriction mechanism 500 according to the first embodiment. In the second embodiment, description will center on the points of difference from the first embodiment, and description of aspects of configuration that are similar to the first embodiment will not be repeated. The description of the first embodiment is suitably applied to those points that are not particularly described in relation to the second embodiment.

As illustrated in FIGS. 12A and 12B, the second engagement member 520 according to the second embodiment includes a shaft portion 523 including a rotation shaft 525 and an engagement portion 524 including an engagement spot 521. The engagement spot 521 engages with a hook-shaped engagement hook portion 512 in a first engagement member 510. The engagement portion 524 is rotatably supported about another rotation shaft 530 with respect to the shaft portion 523 in a vicinity of a distal tip of the shaft portion 523.

Similarly as the first embodiment, the engagement portion 524 including the engagement spot 521 is biased by a helical spring 526 that is wound about the rotation shaft 525, such that the engagement portion 524 projects from a document collection unit 720 towards an upper cabinet 106.

Another helical spring 531 is wound onto the other rotation shaft 530 positioned in the vicinity of the distal tip of the shaft portion 523. The other helical spring 531 is set so that its biasing force is smaller than the biasing force of the helical spring 526. An end 531*a* of the other helical spring 531 is fixed to the document collection unit 720 at a predetermined position. Another end 531*b* of the other helical spring 531 abuts with the engagement portion 524. In this manner, as illustrated in FIG. 12A, the engagement portion 524 is biased so as to project from the document collection unit 720 towards the upper cabinet 106, while being substantially orthogonal to the shaft portion 523. As illustrated in FIG. 12B, the engagement portion 524 is configured rotatable to be substantially in line with the shaft portion 523.

The restriction mechanism 500 according to the second embodiment exhibits the following effects.

The engagement portion 524 of the second engagement member 520 is configured to be rotatable with respect to the shaft portion 523.

When the document collection unit 720 is opened or closed with respect to the upper cabinet 106, the restriction mechanism 500 according to the second embodiment absorbs and mitigates a force related to contact with the hand or finger of a user. This is accomplished in such a manner that only the engagement portion 524 of the second engagement member 520 rotates about the rotation shaft 530 against the biasing force exerted by the helical spring 531 of a small biasing-force with respect to the shaft portion 523, when the hand or finger of the user comes into contact with the second engagement member 520 that projects from the document collection unit 720 towards the upper cabinet 106. That is to say, when the hand or finger of the user comes into contact with the engagement portion 524 only with a small force, the engagement portion 524 will be stored inside the mount 522. Accordingly, it is possible to efficiently reduce the risk of injury to the hand or finger of the user.

Third Embodiment

Figure 13A:
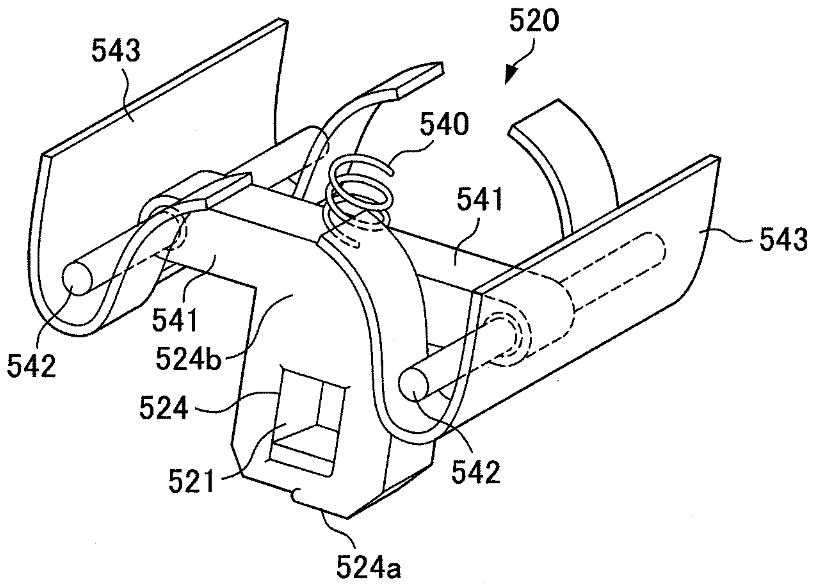
FIGS. 13A and 13B illustrate the configuration of the second engagement member 520 in the copying machine 1 according to a third embodiment.
Figure 13B:
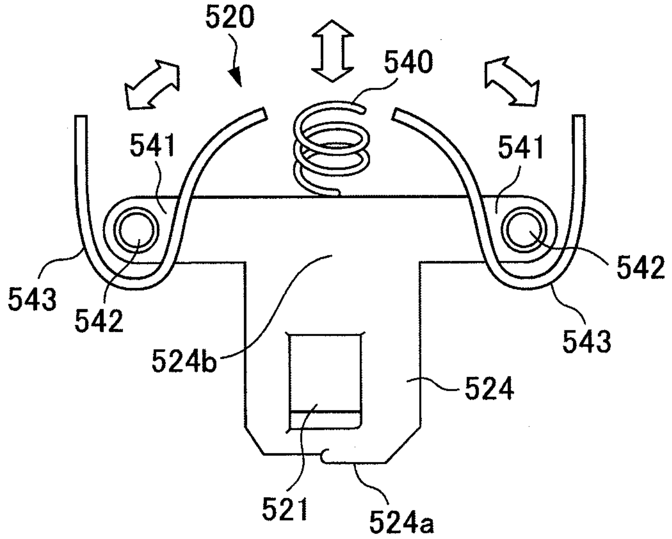
Figures 14A, 14B, 14C:
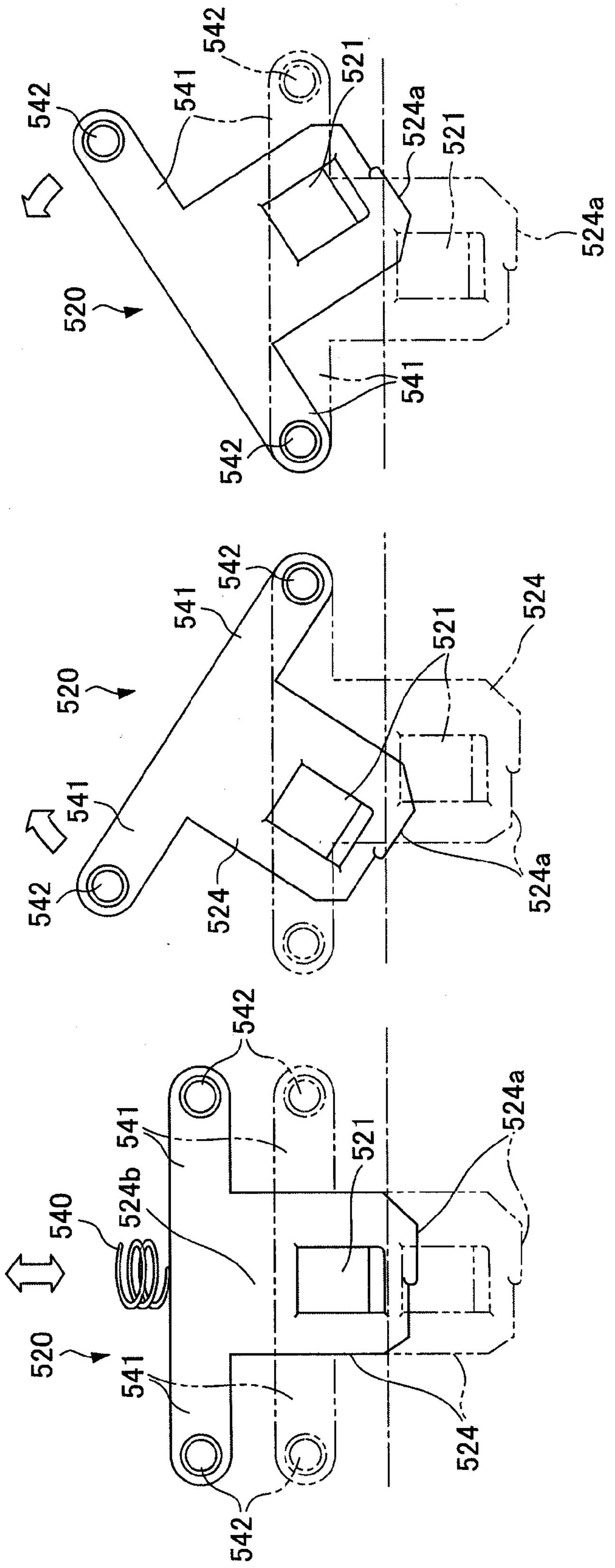
FIGS. 14A to 14C are right side views showing the operation when the second engagement member 520 illustrated in FIGS. 13A and 13B is pressed upwardly.

Next, a third embodiment of the present invention will be described making reference to FIGS. 13A and 13B, and FIGS. 14A-14C. FIGS. 13A and 13B illustrate the configuration of a second engagement member 520 in a copying machine 1 according to a third embodiment. FIG. 13A is an enlarged perspective view and FIG. 13B is an enlarged right side view. FIGS. 14A to 14C are right side views showing the operation when the second engagement member 520 illustrated in FIGS. 13A and 13B is pressed upwardly. FIG. 14A shows an operation when a force is applied directly from below, FIG. 14B shows an operation when a force is applied obliquely from left below, and FIG. 14C shows an operation when a force is applied obliquely from right below.

A restriction mechanism 500 according to the third embodiment mainly differs in the configuration of the second engagement member 520 in comparison to the restriction mechanism 500 according to the first embodiment. In the third embodiment, description will center on the points of difference from the first embodiment, and description of aspects of configuration that are similar to the first embodiment will not be repeated. The description of the first embodiment will be suitably applied to those points that are not particularly described in relation to the third embodiment.

As illustrated in FIGS. 13A and 13B, the second engagement member 520 according to the third embodiment includes an engagement portion 524, a coil spring 540 as a biasing member, a pair of first extending portions 541, a pair of second extending portions 542, and a displacement restricting portion 543 for a second extending portion. The engagement portion 524 includes an engagement spot 521 that engages with an engagement hook 512 of a hook shape of a first engagement member 510.

The coil spring 540 biases the engagement portion 524 in a linear configuration towards a distal tip portion 524*a* of the engagement portion 524. The pair of first extending portions 541 extends in right and left directions from a base portion 524*b* of the engagement portion 524. The pair of second extending portions 542 each extends from proximity of a projecting end of each of the pair of first extending portions 541 in a direction orthogonal to the pair of first extending portions 541. The second extending portion displacement restriction portion 543 is provided corresponding to each of the pair of second extending portions 542. The second extending portion displacement restriction portion 543 is released upwardly, and is adapted with a cutout to prevent interference with the first extending portion 541. The second extending portion displacement restriction portion 543 is configured to receive each of the pair of second extending portions 542 and to restrict the displacement of the pair of second extending portions 542 due to a biasing force exerted by the coil spring 540.

The restriction mechanism 500 described above operates in the following manner when the document collection unit 720 is opened and closed with respect to the upper cabinet 106: The engagement portion 524 displaces in a linear configuration towards the base portion 524*b* against the biasing force exerted by the coil spring 540 as illustrated in FIG. 14A, when the engagement portion 524 is pressed directly upward by contact with the hand or finger of a user at the distal tip portion 524*a* of the engagement portion 524 that projects from the document collection unit 720 toward the upper cabinet 106. In this manner, the engagement portion 524 is retracted (be housed) into the document collection unit 720.

When the engagement portion 524 is pressed obliquely from left below due to the hand or finger of the user coming into contact with the distal tip portion of the engagement portion 524, the engagement portion 524 rotates in a clockwise direction about one (right one) of the second extending portions 542 and is retracted (be housed) into the document collection unit 720, as illustrated in FIG. 14B.

When the engagement portion 524 is pressed obliquely from right below due to the hand or finger of the user coming into contact with the distal tip portion of the engagement portion 524, the engagement portion 524 rotates in a counterclockwise direction about one (left one) of the second extending portions 542 and is retracted (be housed) into the document collection unit 720, as illustrated in FIG. 14C.

The restriction mechanism 500 according to the third embodiment exhibits the following effects.

The second engagement member 520 includes the engagement portion 524, the coil spring 540, the pair of first extending portions 541, the pair of second extending portions 542 and the second extending portion displacement restriction portion 543. The engagement portion 524 has the engagement spot 521 which engages with the first engagement member 510. The coil spring 540 biases the engagement portion 524 towards the distal tip portion 524*a* of the engagement portion 524. The pair of first extending portions 541 extends from the engagement portion 524. The pair of second extending portions 542 extends respectively from the pair of first extending portions 541. The second extending portion displacement restriction portion 543 is provided corresponding to each of the pair of second extending portions 542, receives the pair of second extending portions 542, and restricts the displacement of the pair of second extending portions 542 due to the biasing force exerted by the coil spring 540. When the engagement portion 524 is pressed, the second engagement member 520 is configured to displace towards the base portion 524*b* of the engagement portion 524 or to rotate about one or the other of the pair of second extending portions 542 as a fulcrum.

For this reason, when the document collection unit 720 is opened or closed with respect to the upper cabinet 106, the restriction mechanism 500 according to the third embodiment operates in the following manner: The second engagement member 520 displaces towards the base portion 524*b* of the engagement portion 524 when the hand or finger of a user comes into contact with the second engagement member 520 that projects from the document collection unit 720 towards the upper cabinet 106, and the second engagement portion 524 of the second engagement member 520 is pressed from below. Similarly, when the engagement portion 524 of the second engagement member 520 is pressed obliquely from left below or right below, the second engagement member 520 rotates about one or the other of the pair of second extending portions 542 as a fulcrum. In this manner, it is possible to absorb and mitigate a pressing force that acts on the engagement portion 524, that is to say, a force that acts on the hand or finger of the user. Therefore, even when the hand or finger of the user comes into contact with the second engagement member 520 from various directions, it is possible to efficiently reduce the risk of injury to the hand or finger.

Although exemplary embodiments have been described above, the present invention is not limited to the above embodiments, and may be carried out in various embodiments.

For example, in each of the above embodiments, the reader cover has been described as being composed of the document collection unit 720 that is a part of the document conveyer 107 that conveys the document G to the image reading position J at the image reader 120. However, the invention is not limited in this regard. For example, the reader cover may be a simple cover that does not compose the document conveyer 107.

In the first and the second embodiments, the second engagement member 520 is configured to be displaceable by rotation from the upper cabinet 106 towards the document collection unit 720. However the invention is not limited in this regard. For example, the second engagement member 520 may be configured to be displaceable in a linear orientation from the upper cabinet 106 to the document collection unit 720.

Although the image forming apparatus has been described with reference to a monochrome copying machine 1, there is not limitation in this regard, and it may be applied to a color copier, printer, facsimile, or multifunction peripheral.

What is claimed is:

1. An image forming apparatus, comprising:

a main cabinet comprising an image forming unit configured to form an image on a sheet of medium based on information related to the image;

an upper cabinet, an upper surface of which is provided with a first through hole, disposed openably and closably on the main cabinet and comprising an image reader configured to read an image of an original document to obtain the information related to the image;

a reader cover disposed openably and closably on the upper cabinet and configured to cover the image reader when the reader cover is closed; and a restriction mechanism configured to prevent the reader cover from opening with respect to the upper cabinet when the upper cabinet is open with respect to the main cabinet, wherein the restriction mechanism comprises a first engagement member and a second engagement member, the first engagement member being disposed under the upper surface of the upper cabinet and inside the first through hole, the second engagement member being disposed at the reader cover in a state in which the second engagement member projects downward towards the upper cabinet and being configured to be engageable with the first engagement member, wherein the second engagement member is insertable from upward into the first through hole and the reader cover is prevented from opening with respect to the upper cabinet when the first engagement member engages with the second engagement member inside the first through hole, wherein the second engagement member is rotatably attached to a mount which is fixed to the reader cover, a bottom plate of the mount having a second through hole which is opposite to the first through hole at a time of the reader cover being closed, wherein the second engagement member is urged to project through the second through hole towards the upper cabinet and configured to be movable such that a relative position of the second engagement member with respect to the reader cover is variable in a direction towards the reader cover, and wherein the second engagement member is configured to be movable and completely retractable into above a lower surface of the bottom plate of the mount through the second through hole when the reader cover is located at other positions than a closed position of the reader cover, wherein when the reader cover is closed to overlap with the upper cabinet, the first engagement member is configured to engage with the second engagement member for a case where the reader cover is closed under a condition that an intervening object does not exist between the second engagement member and the first through hole, and the second engagement member is configured to move upward through the second through hole, such that the first engagement member and the second engagement member do not engage with each other, for a case where the reader cover is closed under a condition that an intervening object exists between the second engagement member and the first through hole.

2. The image forming apparatus according to claim 1, wherein the second engagement member is configured to be movable through rotation.

3. The image forming apparatus according to claim 2, wherein a shaft about which the reader cover rotates to open and close is in parallel with a shaft about which the upper cabinet rotates to open and close.

4. The image forming apparatus according to claim 3, wherein a direction in which the reader cover opens and closes is the same as a direction in which the upper cabinet opens and closes.

5. The image forming apparatus according to claim 1, wherein a shaft about which the reader cover rotates to open and close is in parallel with a shaft about which the upper cabinet rotates to open and close.

6. The image forming apparatus according to claim 1, wherein the reader cover is configured to form a portion of a conveyer that conveys an original document to a position of the reader where an image is read.

7. The image forming apparatus according to claim 1, wherein the second engagement member comprises a shaft portion including a shaft about which the second engagement member rotates and an engagement portion including an engagement spot that engages with the first engagement member, and wherein the engagement portion is configured to be rotatable with respect to the shaft portion.

8. The image forming apparatus according to claim 1, wherein the second engagement member comprises:

an engagement portion including an engagement spot that engages with the first engagement member;

an urging member configured to urge the engagement portion towards an end of the engagement portion;

a pair of first extension portions extending from the engagement portion;

a pair of second extension portions extending respectively from the pair of first extension portions; and a restriction portion disposed corresponding to each of the pair of second extension portions and configured to receive each of the pair of second extension portions so as to prevent movement of the pair of second extension portions due to an urging force exerted by the urging member, wherein the engagement portion is configured to shift to a base portion of the engagement portion or to rotate about one of the pair of second extension portions as a fulcrum.

9. The image forming apparatus according to claim 1, wherein the second engagement member comprises an urging member configured to urge the second engagement member to project from the reader cover to the upper cabinet.

* * * * *